Figure 1:
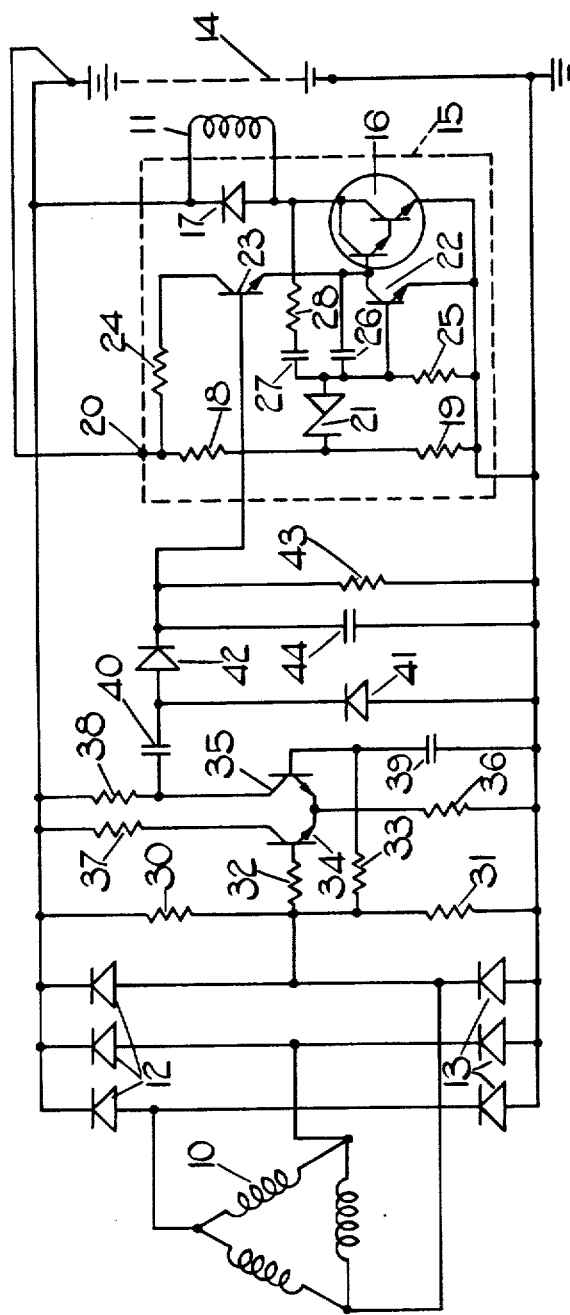

United States Patent [19]

Nicol et al.

[11] 4,297,631

[45] Oct. 27, 1981

[54] BATTERY CHARGING SYSTEMS FOR ROAD VEHICLES

[75] Inventors: Thomas Nicol, Oxted; David Wiley, Walsall; Maurice J. Allport, Edgbaston, all of England

[73] Assignee: Lucas Industries Limited, Birmingham, England

[21] Appl. No.: 128,225

[22] Filed: Mar. 7, 1980

[30] Foreign Application Priority Data

Mar. 16, 1979 [GB] United Kingdom ............... 9372/79

[51] Int. Cl.³ ............................................. H02J 7/16
[52] U.S. Cl. ...................................... 320/64; 322/28; 322/59; 322/73
[58] Field of Search .................. 322/28, 59, 60, 72, 322/73; 320/64, 68

[56] References Cited

U.S. PATENT DOCUMENTS

| | | | |
|---|---|---|---|
| 3,496,443 | 2/1970 | Snedeker et al. | 322/73 X |
| 3,835,363 | 9/1974 | Kirk | 322/28 X |
| 3,982,169 | 9/1976 | Cummins | 322/28 |
| 4,079,306 | 3/1978 | Mori et al. | 320/64 X |

Primary Examiner—Robert J. Hickey
Attorney, Agent, or Firm—Ladas & Parry

[57] ABSTRACT

A battery charging system includes an alternator with a rectifier connecting the alternator output to the battery. A voltage rectifier controls the current in the alternator field winding in accordance with the battery voltage. A transistor switch in the voltage regulator controls the bias current to the output stage of the regulator and is in turn controlled by a differential amplifier through a diode pump. The differential amplifier is connected to detect the presence of an a.c. on one phase of the alternator and causes the transistor to be switched off, disabling the output stage of the regulator, whenever no a.c. signal is present.

6 Claims, 2 Drawing Figures

BATTERY CHARGING SYSTEMS FOR ROAD VEHICLES

This invention relates to battery charging systems for road vehicles.

A conventional battery charging system includes a wound field alternator which is controlled by a voltage regulator sensitive to the battery voltage, the field winding being in series with the output stage of the regulator. In some conventional systems, for example, six diode, three phase, or two diode, single phase systems, the field winding is in series with the vehicle ignition switch with the result that when the vehicle is at rest and the ignition switch is closed there is a steady current through the field winding. Not only does this current have the effect of draining the battery, but also, because there is no cooling airflow through the alternator, it can damage the field winding as a result of overheating and also give rise to a fire hazard. With this type of system there is also the problem that the generator output is effectively reduced due to voltage drops in the ignition supply wiring and switch. In other types of conventional systems the field current is provided by excitation diodes, for example by a trio of excitation diodes in the case of a three phase system, so that there is no field current when the alternator is at rest. However, these systems suffer from the disadvantages that the alternator will not "cut-in" and become self energising until a relatively high speed is reached. Where excitation diodes are provided the field winding is usually also supplied with a small current from the battery through an indicator lamp but such current is usually negligible compared with the normal field winding current. The initial feed to the field improves the initial cut-in speed but failure of the lamp gives unacceptably high initial cut-in speed.

It is an object of the invention to provide a battery charging system in which these disadvantages are overcome.

A battery charging system in accordance with the invention comprises an alternator having a stator winding and a field winding, rectifier means connecting the stator winding to the battery, a voltage regulator having an output stage connected in series with the field winding across the battery and an input stage coupled to the output stage and sensitive to the battery voltage so that, in use, the mean current in the field winding is controlled to maintain a desired battery voltage, and switch means sensitive to an a.c. signal derived from the alternator for preventing current flow through the field winding when the alternator is at rest.

Preferably, said switch means operates by preventing conduction of the output stage of the voltage regulator. Specifically the switch means may include a transistor connected in a path for bias current for the output stage, said transistor being non-conductive when the alternator is at rest.

It will be appreciated that the invention may be employed in systems in which the vehicle ignition switch is connected in series with the field winding or in systems wherein the ignition switch is not so connected.

Figure 2:
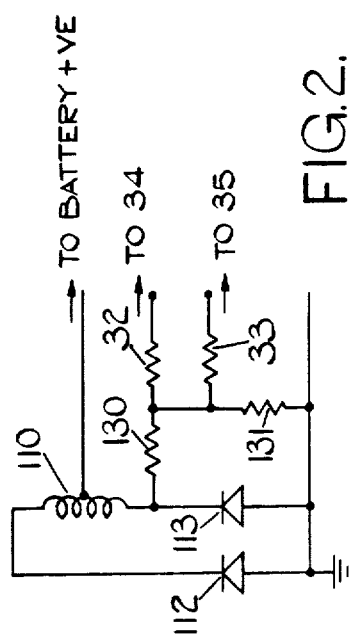

In the accompanying drawings
FIG. 1 is a circuit diagram of one example of the invention and
FIG. 2 is a diagram illustrating a modification of the example shown in FIG. 1 for use in different type of vehicle electrical system.

Referring firstly to FIG. 1, the system shown includes an alternator having a stator winding 10 and a field winding 11, the stator winding 10 being connected by diodes 12, 13 forming a three phase 6-diode full wave rectifier, to the battery 14.

The field winding 11, is connected in series with the output stage of a voltage regulator 15 across the battery 14. This output stage consists of an npn Darlington pair 16 with its emitter connected to the negative terminal of the battery and its collector connected by the field winding 11 to provide a freewheel current path.

The input stage of the voltage regulator 15 includes a pair of resistors 18, 19 connected in series between a terminal 20 and the negative rail. The junction of resistors 18, 19 is connected to the cathode of a zener diode 21, the anode of which is connected to the base of an npn input transistor 22. The emitter of transistor 22 is connected to the negative rail and its collector is connected to the base of the Darlington pair 16. The emitter of an npn transistor 23, the collector of which is connected by a resistor 24 to the terminal 20, is connected to the base of transistor 22. The base of the transistor 22 is connected to the negative rail by a resistor 25, to its own collector by a capacitor 26, and to the collector of the Darlington pair by a capacitor 27 and a resistor 28 in series.

Except for the transistor 23, the voltage regulator 15 is conventional and operates by controlling the on/off ratio of the Darlington pair to maintain the required alternator output to maintain the battery voltage at a predetermined level. During such normal operation the transistor 23 is fully conductive.

Transistor 23 is controlled by the connection of its base to one phase of the alternator via a differential amplifier and a diode pump circuit. The alternator phase in question is connected to the junction of two resistors 30, 31 which are connected in series between the positive and negative rails, the junction of these resistors being also connected by two resistors 32, 33 respectively to the bases of two npn transistors 34, 35. These two transistors have their emitters connected together and connected by a resistor 36 to the negative rail. Two resistors 37, 38 connect the collectors of these transistors to the positive rail. In addition a capacitor 39 is connected between the base of the transistor 35 and the negative rail.

The collector of the transistor 35 is connected by a capacitor 40 to the cathode of a diode 41 and the anode of a diode 42. The anode of the diode 41 is connected to the negative rail and the cathode of the diode 42 is connected by a resistor 43 and capacitor 44 in parallel to the negative rail. The cathode of the diode 42 is also connected to the base of the transistor 23.

Even if there is no field current flowing, if the alternator is being driven an a.c. output, albeit of low voltage, will be produced in each phase as a result of residual magnetism in the rotating field structure. The transistors 34 and 35 form the differential amplifier and the capacitor 39 causes the waveform at the base of transistor 35 to lag behind that at the base of the transistor 34. The transistors 34 and 35 thus switch on and off alternately. The capacitors 40 and 44 and the diodes 41 and 42 constitute the diode pump circuit such that the voltage on capacitor 44 is dependent on the speed of rotation of the alternator. The voltage on capacitor 44 is during normal operation, a substantial proportion of the rail voltage and this maintains transistor 23 switched on so that the voltage regulator can operate normally.

When the alternator is at rest, however, the charge on capacitor 44 leaks away through resistor 43 so that transistor 23 turns off. With transistor 23 off there is no source of base current for the Darlington pair 16 so that this cannot turn on and no current can flow in the field winding.

It will be appreciated that there will be a specific alternator speed at which, during starting of an engine driving the alternator, the alternator will "cut-in" and become self energising. This is the speed at which the voltage on capacitor 44 exceeds the total voltage drop through base-emitters of transistor 23 and Darlington pair 16. A low cut-in speed can be used, since no field current is drawn when at rest, so that, at cut-in, a large field current can be allowed to flow.

For a particular size of alternator, a typical cut-in speed with the circuit shown in FIG. 1 is about 1000 rpm. In the case of a conventional three phase alternator with a 9-diode rectifier of about the same size, in which the initial field current is provided by a small warning light the initial cut-in speed will be about 1800 rpm.

Although the example shown in FIG. 1 has been described with reference to a Delta connected stator winding 10, the circuit could easily be modified for use with a Star winding.

With the arrangement described the whole circuit can be housed in the alternator casing and no external connections other than the main alternator outputs and the battery voltage sensing lead from the battery to terminal 20 are required. Thus no long leads from the voltage regulator to the ignition switch are required to carry the field current. If the field winding is energised from the alternator output terminal the ignition feed voltage drop is eliminated and no machine output capability is lost.

In the example shown in FIG. 2, exactly the same electronic circuit is used for a charging system utilizing a single phase alternator. The single phase winding 110 has its two ends connected to the cathodes of two rectifier diodes 112, 113 having their anodes earthed. A centre tap on winding 110 is connected to the battery +Ve terminal. Instead of resistors 30, 31 the modification uses resistors 131, 132 in series between the cathode of one diode 113 and earth. The resistors 32, 33 connect the common point of resistors 131, 132 to the remainder of the circuit which is exactly as is shown in FIG. 1.

We claim:

1. A battery charging system comprising an alternator having a stator winding and a field winding, rectifier means connecting the stator winding to the battery, a voltage regulator having an output stage connected in series with the field winding across the battery and an input stage coupled to the output stage and sensitive to the battery voltage so that, in use, the mean current in the field winding is controlled to maintain a desired battery voltage, and switch means sensitive to an a.c. signal derived from the alternator for preventing current flow through the field winding when the alternator is at rest, said switch means including a differential amplifier connected to detect the presence of an a.c. signal at the alternator output and a diode pump circuit driven by the output of said differential amplifier.

2. A battery charging system as claimed in claim 1 in which said switch means is connected to the output stage so as to disable the latter when the alternator is at rest.

3. A battery charging system as claimed in claim 2 in which said output stage includes a path of bias switch means comprising a transistor in said bias path and means for rendering said transistor non-conductive when the alternator is at rest.

4. A battery charging system as claimed in claim 1 in which said differential amplifier has both of its inputs connected to the alternator output, a delay circuit being included in the connection to one input.

5. A battery charging system as claimed in claim 4 in which the alternator is a polyphase alternator, and one phase of the alternator output is connected to the junction of two resistors in series across the battery, said inputs of the differential amplifier being connected to said junction.

6. A battery charging system as claimed in claim 4 in which the alternator is a centre-tapped single phase alternator, the two ends of the alternator stator winding being connected by diodes to one battery terminal and the centre tapping being connected to the other, and said inputs of the differential amplifier being connected to the junction of two resistors connected in series across one of the diodes.

* * * * *